Patented Aug. 24, 1943

2,327,812

UNITED STATES PATENT OFFICE 2,327,812

FUNGICIDE AND METHOD OF MAKING THE SAME

Sisto E. Marsico, Aspinwall, Pa.

No Drawing. Application April 29, 1941,
Serial No. 390,921

8 Claims. (Cl. 167—16)

My present invention relates to a toxic composition of matter adapted to be employed as a fungicide, the invention comprises both a fungicidal composition and the procedural steps by means of which the same is prepared.

Various fungicides are known and employed which are more or less effective for their intended purpose, but, so far as I am aware, these fungicides are often characterized by an inadequate action or are of such nature that they do not persist and, for example, are difficult to distribute so as to produce and maintain an intimate contact with the plant life or other material to be protected. Difficulty has also been experienced in securing uniform or homogeneous fungicides resulting in uneven application and hence inadequate protection to some plants or parts of plants. This has further proved to be uneconomical and wasteful.

It is, therefore, one of the objects of my invention to produce a fungicidal composition which shall overcome the defects and disadvantages of known fungicides and which shall be additionally characterized by advantages and utilities peculiar to itself.

Another object of the invention resides in the production of a fungicide which is produced as a relatively stable homogeneous liquid composition in which one of the component parts has an emulsifying action on another component part so as to produce an unusual and highly effective composition.

A further object of the invention resides in the production of a fungicidal composition which contains as an essential ingredient thereof one or more poisonous materials derived from certain Cicuta plants.

A still further object of the invention resides in a toxic composition of matter fatal to fungus growths and which contains a chloroform liniment extract of certain named Cicuta plants.

A still further object of the invention resides in procedural steps or operations by means of which toxic compositions fatal to fungus growths are extracted from certain Cicuta plants and converted to a liquid form.

Other and further objects and advantages will either be understood by those skilled in this art or will be apparent or pointed out hereinafter.

Broadly speaking, my invention involves a liquid composition of matter adapted to be used as a fungicide and which contains one or more poisonous or toxic substances derived from Cicuta plants. While the poisonous extracts derived from those plants, as set forth more fully hereinafter, differ in their poisonous or toxic character, it is to be understood that, depending upon the intended use of the composition and the nature of the fungus growths to be destroyed or prevented from growing, any one or combination of such poisonous substances may be employed within the purview and scope of this invention.

The Cicuta plants here involved include at least three distinct species, all belonging to the family apiaceae. These species will hereinafter be referred to, and designated as Cicuta maggiore, Cicuta minor and Cicuta virosa.

The plant Cicuta maggiore is known under other names such as Conium maculatum and common or official Cicuta sinomino. This is a biennial plant of the apiaceae family which grows in wild or stony places in Europe and other parts of the world and which is more commonly referred to under the name of poison hemlock. This plant contains an active alkaline principle which is a powerful poison, such being the volatile alkaloid Conine (or Conia) and having the formula $C_8H_{17}N$. This alkaloid is an oily liquid substance sometimes referred to as Conicina.

The plant Cicuta minor is also known as Aethusa cynapium. This is a garlic-family grass of annual and herbaceous growth, otherwise known under the common names of false parsley, wild parsley or fool's parsley. This plant is a poisonous umbellifer containing the reddish-yellow oily poisonous substance Cynapin, which while strongly poisonous or toxic to fungi is less so than Conine above mentioned.

The plant Cicuta virosa is also known as Aquatic cicuta or water hemlock. It is a perennial plant which is entirely poisonous, although the roots are more poisonous than the balance of the plant. The poisonous substance contained in this plant is Cicutine, a volatile alkaloid which is toxic to fungi but materially less so than Cyanapin above mentioned.

In preparing my fungicidal composition of matter in accordance with the present invention I first form a Cicuta extract. The Cicuta roots, leaves, flowers, stems and seeds are first reduced to a finely granulated form by grinding or other suitable operation and then are immersed in chloroform liniment (U. S. P.). The Cicuta plants are macerated in the chloroform liniment for a prolonged period of time of the order of about 24 hours and at the end of this period of maceration the resultant material is filtered so as to produce a clear liquid or extract.

In carrying out these operations the Cicuta plants are utilized in the ratio of approximately 3 grams of the plants to 100 cc. of chloroform liniment, and I have discovered that the liquid or extract which results from the employment of these ingredients in the indicated proportions produces a liquid composition which has exceptionally great toxic powers, in which connection it has a new and unusually effective action on fungi. I believe that the unexpected efficacy of the Cicuta extract is due, at least in large part, to its unusually high content of Conine, Cynapin or Cicutine, there having been a complete or substantially complete extraction of poison from the *Cicuta maggiore, minor* and/or *virosa*.

I separately produce a solution of copper sulphate ($Cu_2SO_4$) in chloroform liniment (U. S. P.) in the proportion of approximately 3 grams of copper sulphate to 100 cc. of the chloroform liniment. This material is filtered to produce a clear liquid or extract.

I now combine the two liquids or extracts produced as above described. In carrying out this part of my invention I thoroughly mix the extract of Cicuta with the extract of copper sulphate and I employ these extracts in the approximate proportions of 1340 cc. of the Cicuta extract to 2500 cc. of the copper sulphate extract. This combined or composite extract is diluted with water in the range of 100–200 parts of water to 1 part of combined extract and is then in condition for use. The concentrated or diluted composition should be kept in a closed container until used.

The fungicide so prepared is in the form of a homogeneous uniform liquid material in which the chloroform liniment has an emulsifying action upon the Conine, Cynapin or Cicutine or any combination thereof so as to produce a composition which does not stratify or separate out upon standing. I have further discovered that the chloroform liniment imparts to the fungicide a wetting capacity which makes it particularly effective since this characteristic promotes intimate contact between the fungicide and the plant life. Finally, the chloroform liniment constitutes an excellent spraying agent, thus making it possible to atomize or spray the fungicide in very fine droplets or in mist-like form, thus increasing the efficiency of the composition and making a given amount of composition sufficient for a maximum area or surface. While the chloroform component of the chloroform liniment tends to volatilize or dissipate in air after application thereof, this acts to release the poison or toxic material so as to make it quickly available for the destruction of fungi or for the prevention of the growth of fungi on surfaces, trees, leaves, etc., not yet attacked.

The term "chloroform liniment" as used herein refers to the composition or its equivalent specified in the Xth edition of the United States Pharmacopoeia. As there defined, this is composed of 30% chloroform and 70% camphor soap liniment, the latter being in turn composed of 60 grams of hard soap, 45 grams of camphor oil, 10 cc. of oil of rosemary and 700 cc. of alcohol, together with sufficient aqua distillata to produce 1000 cc. of the camphor soap liniment.

As I have pointed out above, I may employ *Cicuta maggiore, Cicuta minor* and *Cicuta virosa* singly or in any combination of two or more. The particular Cicuta plant employed depends upon the toxicity required in any given composition and this in turn depends upon the fungus growths encountered or against which protection is desired under any given conditions. Inasmuch as the toxic components of these Cicuta plants, namely, Conine, Cynapin and Cicutine, respectively, have different degrees of toxicity, it will be apparent that I can produce a fungicide having a desired, predetermined or specific toxicity by appropriately selecting and proportioning the different types of Cicuta plants. I have found that all these Cicuta plants are, however, operative severally as well as in any combination of two or more thereof and, therefore, I deem it a part of my invention to employ such plants singly and in any combination. In some cases availability and cost of the Cicuta plants should be taken into account for matters of economy.

The foregoing is intended as illustrative or exemplary and not as limitative or restrictive, and within the terms of the appended claims I may resort to various additions, omissions, substitutions and modifications.

Having thus described my invention, what I claim as new and desire to secure by Letters Patent is:

1. A fungicide which comprises a stable mixture of chloroform liniment extract of Cicuta plant and a chloroform liniment extract of copper sulphate.

2. A fungicide which comprises a stable mixture of chloroform liniment extract of Cicuta plant and a chloroform liniment extract of copper sulphate, the extracts being present in the respective proportions of approximately 1340 parts and 2500 parts by volume.

3. A fungicide which comprises a stable mixture of chloroform liniment extract of Cicuta plant and a chloroform liniment extract of copper sulphate, said Cicuta plant extract containing the poisonous components of 3 grams of Cicuta plants to each 100 cc. of chloroform liniment.

4. A fungicide which comprises a stable mixture of chloroform liniment extract of Cicuta plant and a chloroform liniment extract of copper sulphate, said chloroform liniment extract of copper sulphate containing copper sulphate in the proportions of 3 grams to each 100 cc.

5. A method of making a fungicide of the character described which comprises granulating Cicuta plants, immersing the same in chloroform liniment in the proportions of approximately 3 grams of plant to 100 cc. of liniment, macerating the said plants in the said liniment for a prolonged period of time to extract substantially all the poison therefrom, filtering such material to produce a liquid extract of high toxic character, separately dissolving copper sulphate in chloroform liniment in the proportions of approximately 3 grams of the former to 100 cc. of the latter and filtering the same to produce a liquid extract and then intimately mixing such extracts in the approximate proportions of 1340 parts to 2500 parts, by volume, respectively.

6. A method of making a fungicide of the character described which comprises extracting the poisonous components of Cicuta plants with chloroform liniment in a predetermined concentration, forming a copper sulphate solution of chloroform liniment of approximately the same concentration and combining the two to produce a finished fungicide in the form of a relatively stable uniform liquid.

7. A stable homogeneous liquid composition of matter having fungicidal properties and adapted to be sprayed on surfaces to be protected and when so sprayed making intimate wetting contact therewith, said composition of matter being composed of the double extract defined by claim 2 and water, the water content being from about 100–200 times as great, by volume, as the said double extract.

8. A composition of matter having fungicidal properties and consisting of, by volume, about 100–200 parts of water to each part of double extract as set forth in claim 1.

SISTO E. MARSICO.